US006618164B1

(12) United States Patent
Shima

(10) Patent No.: US 6,618,164 B1
(45) Date of Patent: Sep. 9, 2003

(54) NETWORK PRINTER AND NETWORK PRINTING METHOD

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/415,206

(22) Filed: Oct. 12, 1999

(51) Int. Cl.$^7$ ............................ B06F 15/00; G06F 15/00
(52) U.S. Cl. ................. 358/1.15; 358/1.9; 358/1.16; 358/1.13; 358/473; 358/1.12
(58) Field of Search ............................ 358/1.15–1.18

(56) References Cited

U.S. PATENT DOCUMENTS

| 4,992,958 | A |   | 2/1991  | Kageyama et al. |           |
|-----------|---|---|---------|-----------------|-----------|
| 5,313,286 | A | * | 5/1994  | Sugiura et al.  | 358/3.07  |
| 5,832,301 | A | * | 11/1998 | Yamaguchi       | 710/48    |
| 6,272,147 | B1| * | 8/2001  | Spratt et al.   | 370/447   |
| 6,333,789 | B1| * | 12/2001 | Shima           | 358/1.15  |

FOREIGN PATENT DOCUMENTS

| EP | 0 744 685 A1 | 11/1996 |           |
|----|--------------|---------|-----------|
| JP | 3-213370     | 9/1991  | B41J/5/30 |
| JP | 9-286152     | 11/1997 | B41J/29/38|
| JP | 10-97391     | 4/1998  | G06F/31/12|

* cited by examiner

Primary Examiner—Edward Coles
Assistant Examiner—Saeid Ebrahimi
(74) Attorney, Agent, or Firm—Sughrue Mion, PLLC

(57) ABSTRACT

A single CPU executes three tasks, a communication task, an image production task, and a print task. A block managing section has plural reception blocks of plural sizes, and determines a reception block which is to be given to the communication task, in accordance with the use states of the reception blocks. When the rate of receiving data from a network is higher than the data processing rate in a printer, a block of a size which is larger than that of the previous block is given to the communication task. When the data receiving rate is lower, a block of a size which is smaller than that of the previous block is given to the communication task. According to this configuration, even when the traffic congestion of the network, or the like is changed, it is possible to suitably allocate the CPU execution time period to the tasks.

14 Claims, 8 Drawing Sheets

NETWORK PRINTER AND NETWORK PRINTING METHOD

BACKGROUND OF THE INVENTION

1. Field of the Invention

The present invention relates to a network printer which performs printing on the basis of data received via a network such as a LAN (Local Area Network), and also to a network printing method.

The present application is based on Japanese Patent Application No. Hei. 10-291910, which is incorporated herein by reference.

2. Description of the Related Art

In a printer which is locally connected to a host computer via a parallel I/F or the like, print data are input basically as it is, and at a relatively constant rate. In such a local printer, therefore, it is requested to store received print data as they are into a reception buffer, and printing can be enabled by only sequentially taking out stored data and interpreting the data.

Recently, however, a network printer which is to be connected to a host computer via a network such as a LAN is widely used. In such a network, usually, data communication between the host computer and the printer is performed by using a protocol hierarchy in which plural protocols are layered. When print data are transmitted from the host computer, therefore, the print data are divided into packets of a variable or fixed length, and data other than the print data, such as a destination address, a source address, the data length, and a frame check are added to each packet. In the printer, extra data such as the destination address are removed away from the received packet while tracing back through the protocol hierarchy, and the original print data are then reconstructed.

In this way, in the case of a network printer, print data must be stored into a reception buffer after the data are reconstructed from a packet. Therefore, a network printer is provided with a dedicated CPU (Central Processing Unit) or MPU (Micro Processing unit), in addition to that for producing a print image.

In a network printer described above, the packet reception from a network and production of a print image are processed by different CPUs, respectively. The CPU for a communication process is used only for a network process, and the CPU for print image production is used for producing a print image (producing a print request), thereby producing problems in that the utilization ratios of the CPUs are low, and that the production cost is increased. When complex bidirectional communications are to be performed between the network printer and the host computer, a protocol for coupling the CPU for a communication process with the CPU for print image production is additionally required. Furthermore, data are transmitted between the CPUs, so that the number of operations of copying data between memories tends to be increased, thereby producing another problem in that the process efficiency is low.

In order to solve such problems, it is contemplated that a CPU of relatively high performance executes both a communication process (communication task) and an image production process (image production task). In this case, however, the use of the single CPU causes the process efficiency to be instead lowered unless executions of the tasks are suitably distributed. In the case where the operation state of the communication task continues for a long term, the packet reception from a network can be rapidly processed, but the operation state of the image production task is lowered, so that a long time period elapses before starting the actual printing, whereby the throughput of printing is lowered. In contrast, when the operation state of the image production task is enhanced, the packet reception is delayed and a long time period elapses before the host computer is released from the transmission of print data. Switching between tasks requires a time period of about several hundreds of microseconds. When the tasks are frequently switched over, therefore, waste switching periods are accumulated. As a result, there arises a fear that the process efficiency is lowered.

SUMMARY OF THE INVENTION

The invention has been conducted in view of various problems discussed above. It is an object of the invention to provide a network printer and a network printing method in which the operation states of reception of data from a network and image data production in a printer can be suitably controlled. It is another object of the invention to provide a network printer and a network printing method in which the execution privilege of a processing unit which is to be allocated to a communication process and an image production process is suitably controlled, thereby enabling both the processes to be efficiently executed.

In order to attain the objects, in the network printer of the invention, a communication process and an image production process are controlled in accordance with a rate of receiving data from a network and a data processing rate in a printer.

According to a first aspect of the invention, a network printer which performs printing on the basis of data received via a network is provided. The printer comprises: a communication processing section which receives data via a network; an image production processing section which interprets the data supplied from the communication processing section, and produces image data; a print processing section which controls a drive of a print engine on the basis of the image data supplied from the image production processing section, thereby performing printing; and an operation state controlling section which, in accordance with a rate of receiving data from the network and a data processing rate in the image production processing section, controls an operation state of the communication processing section and an operation state of the image production processing section.

Data (packet) which are transmitted from a host computer to a network such as a LAN are received by the communication processing section. Based on a protocol hierarchy and the like, the communication processing section configures print data from the received data. The image production processing section interprets the data supplied from the communication processing section, and produces image data. The print processing section controls the drive of the print engine on the basis of the image data, thereby performing printing.

The communication processing section and the image production processing section use computer resources such as a memory and a CPU. Typically, at least the communication processing section and the image production processing section can be executed by a single processing unit. When one of the processing sections occupies the computer resources for a long term, therefore, the execution of the other processing section is hindered. When the execution time period of the communication processing section is long, for example, the data reception from the network can be smoothly performed, but the image production process is delayed. In contrast, when the execution time period of the image production processing section is prolonged, the data reception from the network is delayed.

For example, it may be contemplated that executions of the processing sections are switched over at predetermined periods or at each time when a given amount of data have been received. The suitable execution time period of the communication processing section is affected by the rate of receiving data from the network, and that of the image production processing section is affected by the data processing rate of the image production process. The data receiving rate and the data processing rate are varied every moment in accordance with the situations. Namely, when the network is busy, the timing of a packet arrival from the network is unstable and the data processing rate is lowered. Even when the communication processing section is provided with the execution privilege of the CPU for a long term during a period when the network is busy, the substantial operation time period is short. Therefore, the computer resources are wastefully occupied, and a waste waiting time of the image production processing section is prolonged. In contrast, when the traffic congestion of the network is low in degree, packets successively arrive from the network. Therefore, the data reception is delayed unless the execution time period of the communication processing section is prolonged. On the other hand, with respect to the data processing rate in the image production processing section, the actually required processing time period is varied depending on the kind of the printing language, and the degree of complexity of an image constituting a page, and the like.

When a fixed switching operation based on, for example, a constant time period or a constant amount of data is performed, therefore, it is difficult to efficiently execute the communication process and the image production process. Switching between processings requires a given switching time period. When the processes are frequently switched over, therefore, waste switching periods are accumulated, so that the process efficiency of the whole system is lowered. In the invention, the operation state controlling section is disposed, and the operation states of the communication processing section and the image production processing section are controlled in accordance with the data receiving rate and the data processing rate. The operation state controlling section dynamically changes the operation states of the communication processing section and the image production processing section, based on the data receiving rate and the data processing rate. Even when the traffic congestion of the network, or the like is changed, therefore, the processing sections are enabled to suitably operate.

The operation state controlling section may control the transfer amount of data which are supplied from the communication processing section to the image production processing section. According to this configuration, it is possible to control the operation states of the communication processing section and the image production processing section.

The image production processing section is activated by occurrence of an event of a data entry from the communication processing section. When the transfer amount of data which are supplied from the communication processing section to the image production processing section is controlled, therefore, the communication processing section and the image production processing section are enabled to suitably operate.

When the data receiving rate is lower than the data processing rate, the operation state controlling section may decrease the data transfer amount, and, when the data receiving rate is higher than the data processing rate, may increase the data transfer amount.

When the data receiving rate is caused to be relatively lower than the data processing rate by traffic congestion of the network or the like, the transfer amount of data from the communication processing section to the image production processing section is decreased. Each time when a small amount of data is received, therefore, the communication processing section performs the operation of transferring data to the image production processing section. As a result, chances of activation of the image production processing section are increased, so that a waste waiting time of the image production processing section can be shortened. In contrast, when the data receiving rate is relatively higher than the data processing rate, the transfer amount of data from the communication processing section to the image production processing section is increased. Each time when a large amount of data is received, therefore, the communication processing section transfers the data to the image production processing section. As a result, the number of operations of switching between the communication processing section and the image production processing section can be reduced and the switching time period can be shortened.

The operation state controlling section may comprise plural memory blocks each of which has plural sizes and which are used for transferring data from the communication processing section to the image production processing section, and, in accordance with the data receiving rate and the data processing rate, may determine one of the memory blocks which is to be used next time.

The communication processing section stores data into a memory block which is delivered from the operation state controlling section. When the memory block is filled with data, the image production processing section is activated so as to read out the data from the memory block and then produce an image. When the size of a memory block which is used for data transfer between the communication processing section and the image production processing section is adjusted, therefore, the operation states of the processing sections can be suitably controlled.

When memory blocks of a size which is smaller than a size of a memory block that is used at a previous time are free in a number which is equal to or larger than a predetermined number, the operation state controlling section may select one of the memory blocks of a smaller size, when memory blocks of a size which is smaller than a size of the memory block that is used at the previous time are not free in a number which is equal to or larger than the predetermined number and a memory block of a size which is equal to the size of the memory block that is used at the previous time is free, select the memory block of the same size, and, when the memory block of the same size is not free and a memory block of a size which is larger in size than the size of the memory block that is used at the previous time is free, select the memory block of a larger size.

Each time when a data is received from the network, the communication processing section can configure the received data into print data, and then store the print data into a memory block. The image production processing section can be activated during a period when the communication processing section is not activated, so as to read out the print data from the memory block and produce an image.

The case where, at a certain timing, the rate of receiving data from the network is lower than the data processing rate means that the rate of forming memory blocks storing data is lower than that of forming free memory blocks. In the case where the data processing rate is constant, the time period which is required for reading out data from a memory block to make the memory block free is shorter as the size of the memory block is smaller. When the data receiving rate is lower than the data processing rate by a predetermined value or more, therefore, a process on memory blocks storing data advances. Consequently, memory blocks the number of which is larger than a predetermined number, and having a size which is smaller than the size of the memory block that is used at the previous time become free. In other words, the case where memory blocks the number of which is larger than a predetermined number, and having a size which is smaller than the size of the memory block that is used at the previous time become free means that the size of the memory block that is used at the previous time is too large in view of the difference between the data receiving rate and the data processing rate. When memory blocks the number of which is larger than the predetermined number and having a small size become free, therefore, data transfer between the communication processing section and the image production processing section is performed by using the memory blocks of a small size. According to this configuration, chances of activation of the image production processing section are increased, so that a waiting time can be shortened.

When memory blocks having a small size are free in a number which is not larger than the predetermined number and a memory block of a size which is equal to the size of the memory block that is used at the previous time is free, the data receiving rate substantially balances with the data processing rate. In this case, therefore, the memory block of the same size is selected. The case where also a memory block of the same size is not free means that the data receiving rate is higher than the data processing rate and memory blocks are sequentially filled with data. Therefore, memory blocks of a size which is larger than the size of the memory block that is used at the previous time, so that the amount of data which are supplied at a time into the image production processing section is increased. As a result, the number of switching operations can be reduced.

In this way, on the basis of the use states of the memory blocks, a memory block which is to be used next time is determined, whereby a suitable memory block can be selected without monitoring the data receiving rate and the data processing rate.

In the operation state controlling section, a memory block of minimum size may be set as an initial value.

Alternatively, in the operation state controlling section, a memory block of intermediate size may be set as an initial value.

When an intermediate size is set as the initial value, the possibility that the state is promptly transferred into the balanced state, i.e., the state in which a memory block of the same size is repeatedly used is increased. When a memory block of a size corresponding to the minimum one of print jobs which are usually possible is used as an intermediate size, the possibility that data can be received by using a reception block of a size which is suitable for the print job is increased. Therefore, image data can be produced by using only the initial reception block, so that the process efficiency is improved.

In accordance with the data receiving rate and the data processing rate, the operation state controlling section may determine a size of a memory block which is used for transferring data from the communication processing section to the image production processing section, and produce a memory block of the determined size.

That is, memory blocks of plural sizes are not previously prepared, a memory block of a suitable size may be produced in accordance with the data receiving rate and the data processing rate.

In this case, when the data receiving rate is lower than the data processing rate, the operation state controlling section may produce a memory block of a size which is smaller by a predetermined value or more than a size of a memory block that is used at a previous time; when the data receiving rate is higher than the data processing rate, produce a memory block of a size which is larger by a predetermined value or more than the size of the memory block that is used at the previous time; and, when the data receiving rate balances with the data processing rate, produce a memory block of a size which is within a predetermined range with respect to the size of the memory block that is used at the previous time.

The operation states of the communication processing section and the image production processing section can be suitably controlled by adjusting the size of a memory block in accordance with relationships between the data receiving rate and the data processing rate.

The communication processing section may be higher in priority for acquiring execution privilege in the processing unit, than the image production processing section.

According to this configuration, the data reception is processed with a higher priority, so that the computer can be early released.

According to a second aspect of the invention, there is provided a network printer comprising: a communication task of receiving data via a network; an image production task, having a lower priority than the communication task, of interpreting the data supplied from the communication task, and producing image data; and a print processing section which controls a drive of a print engine on the basis of the image data supplied from the image production task, a single central processing unit (CPU) switchably executing the communication task and the image production task, wherein, in accordance with a rate of receiving data which are supplied from the network to the communication task and a data processing rate in the image production task, an operation state of the image production task is controlled.

According to a second aspect of the invention, there is provided a network printing method in which a communication task of receiving data via a network, an image production task of interpreting the data supplied from the communication task, and producing image data, and a print task of performing printing on the basis of the image data supplied from the image production task are switchably executed a single central processing unit (CPU), a priority for acquiring execution privilege in the processing unit is higher in a sequence of the print task, the communication task, and the image production task, and the method comprises steps of: in accordance with a rate of receiving data which are supplied from the network to the communication task and a data processing rate in the image production processing task, determining a size of a memory block for storing data supplied to the image production task, so as to provide the image production task with a suitable execution time period; storing the data received from the network into a memory block of the determined size, by the communication task; informing the image production task that the data are stored into the memory block; reading data from the memory block to produce image data, by the image production task; informing the print task of the production of image data; and performing printing on the basis of the supplied image data, by the print task.

In the invention, the production task, the communication task, and the image production task are executed with giving priorities in this sequence by the single processing unit. According to this configuration, it is possible to attain the same effects as aforementioned.

According to a second aspect of the invention, there is provided a recording medium on which programs for controlling a network printer which performs printing on the basis of data received via a network are recorded, programs for causing a computer to realize: a communication processing section which receives data via a network; an image production processing section which interprets the data supplied from the communication processing section, and produces image data; a print processing section which controls a drive of a print engine on the basis of the image data supplied from the image production processing section, thereby performing printing; and an operation state controlling section which, in accordance with a rate of receiving data from the network and a data processing rate in the image production processing section, controls a transfer amount of data which are supplied from the communication processing section to the image production processing section, are recorded in a form in which the programs are readable and understandable by the computer.

When predetermined programs are read into a computer of a printer, it is possible to obtain a printer which exerts the same effects as those of the invention as aforementioned. As "recording medium," various kinds of recording media such as a hard disk, a floppy disk, a memory, and an IC card may be used. Alternatively, a communication medium may be used by, for example, downloading programs via a network.

Features and advantages of the invention will be evident from the following detailed description of the preferred embodiments described in conjunction with attached drawings.

DETAILED DESCRIPTION OF THE PREFERRED EMBODIMENTS

Hereinafter, embodiments of the invention will be described with reference to the accompanying drawings.

Figure 1:
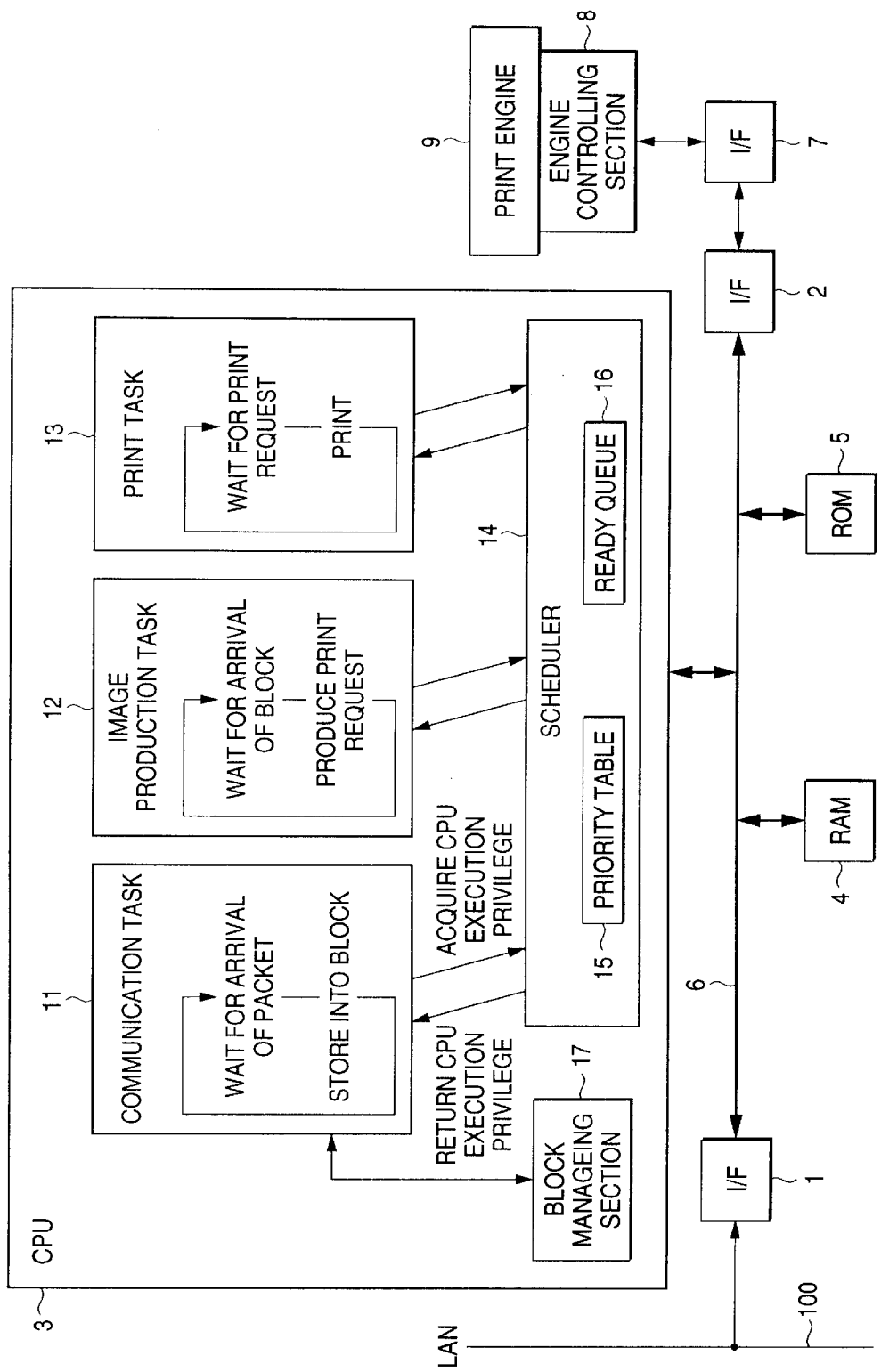
FIG. 1 is a block diagram showing the whole configuration of a network printer of a first embodiment of the invention.

FIGS. 1 to 7 show a network printer of a first embodiment of the invention. FIG. 1 is a view schematically showing the whole configuration of the network printer of the embodiment.

The network printer comprises interfaces (hereinafter, abbreviated as "I/Fs") 1 and 2, a CPU 3, a RAM 4, a ROM 5, an engine controlling section 8, and a print engine 9. The I/Fs 1 and 2, the CPU 3, the RAM 4, and the ROM 5 are connected to one another via a bus 6. The engine controlling section 8 is connected to the CPU 3 and the like via I/Fs 2 and 7. The CPU 3 performs data communication with a network 100 such as a LAN via the I/F 1, and with the engine controlling section 8 via the I/F 2.

The CPU 3 serving as "processing unit" is configured so as to be able to execute three tasks, a communication task 11, an image production task 12, and a print task 13. Switching among the tasks 11 to 13, i.e., management of the CPU execution privilege is performed by, for example, a scheduler 14 which can be expressed as a switching controlling section. The scheduler 14 has a priority table 15 which stores priorities of the tasks 11 to 13, and a ready queue 16 for connecting tasks in a waiting state. In the embodiment, priorities are assigned to the print task 13, the communication task 11, and the image production task 12 in this sequence. The scheduler 14 provides the tasks 11 to 13 with the CPU execution privilege on the basis of the preset priorities.

When a packet arrives from the network 100, the communication task 11 serving as "communication processing section" is provided with the CPU execution privilege and then activated. The communication task 11 removes away extra data such as an IP address from the received packet, to take out print data. The print data are stored until a predetermined reception block which will be described later is filled with the data. The reception block storing the data is delivered to the image production task 12. The communication task 11 is configured by plural tasks respectively corresponding to protocols such as an FTP (File Transfer Protocol) and an LPR (Line Printer Protocol).

Upon reception of the reception block storing data from the communication task 11, the image production task 12 serving as "image production processing section" is activated. The image production task 12 reads out the data in the reception block and produces a print image (print request), and delivers the produced print request to the print task 13. The image production task 12 is a single task corresponding to one printing language, and not configured by tasks respectively corresponding to plural printing languages. Usually, the whole of one print job is described by one kind of printing language. Therefor, it is requested only to, when the print job is switched to another one, activate a task of a print language corresponding to the other print job. When the image production task 12 is configured by a task of a single print language, it is possible to early process a print job. Alternatively, the image production task 12 may be configured by plural tasks. It seems that, in the case of a print language requiring a high-level process, such as PostScript, the process efficiency is improved by producing a print request by means of cooperative operation of plural tasks.

Upon reception of the print request from the image production task 12, the print task 13 serving as "print processing section" is activated, and, in accordance with the print request, drives the engine controlling section 8. The engine controlling section 8 drives the print engine 9 to perform the printing operation in the unit of a page. The engine controlling section 8 and the print engine 9 may be expressed as printing means or a printing section.

A block managing section 17 serving as "operation state controlling section" determines a reception block which is to be used in reception of a packet, on the basis of the data receiving rate in reception of a packet from the network 100, and the processing rate in the printer which is mainly due to the image production task 12. The block managing section 17 may be expressed as, for example, a data transfer amount controlling section.

Figure 2:
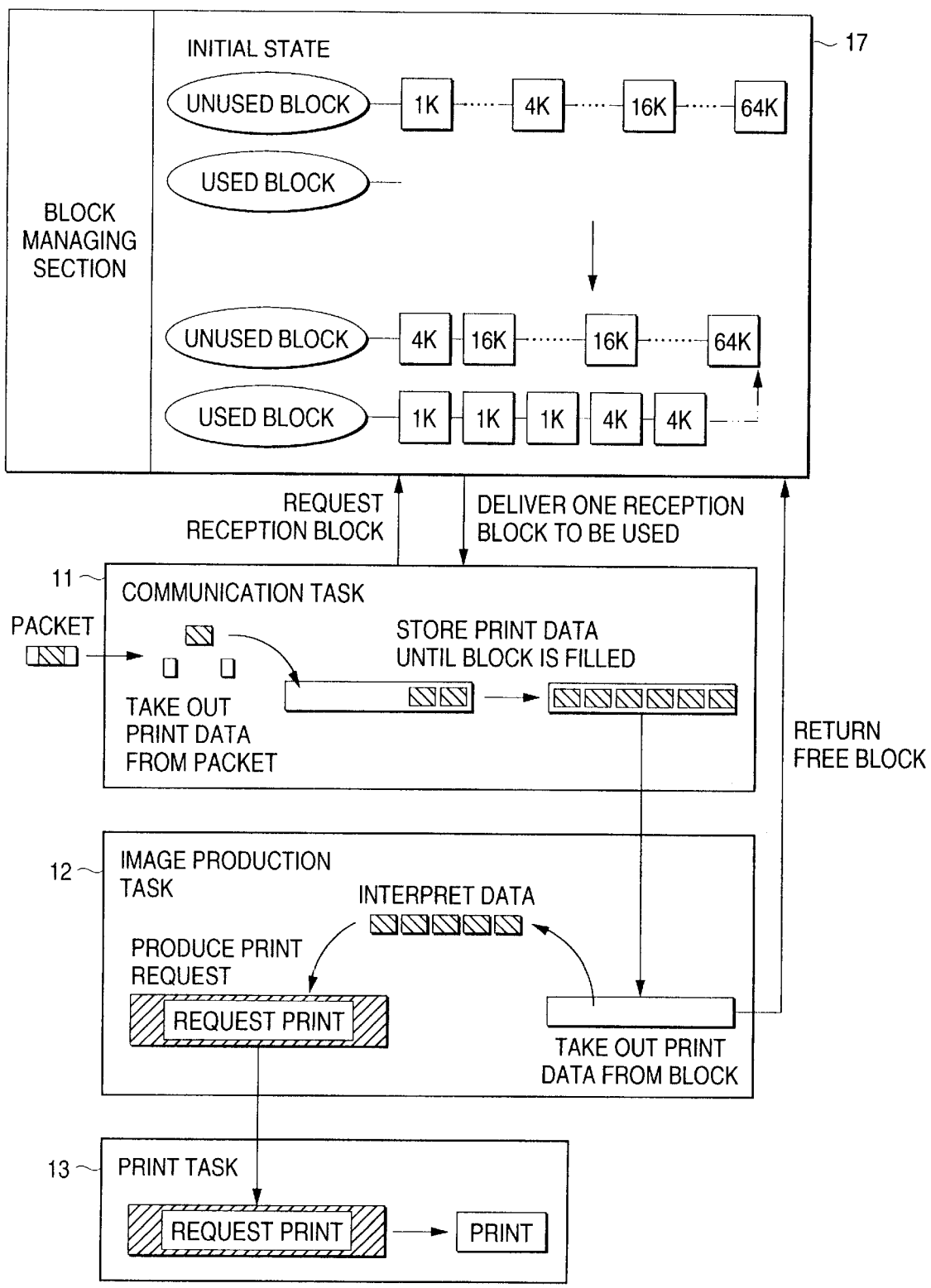
FIG. 2 is a view showing relationships among a block managing section and tasks.

FIG. 2 is a view schematically showing the structure of the management of the reception block by the block managing section 17 and the execution states of the tasks 11 to 13.

The block managing section 17 shown in the upper portion of FIG. 2 has plural sets of reception blocks of different sizes which are obtained by quadrupling the preceding size, for example, 1 kB (kilobyte), 4 kB, 16 kB, and 64 kB. The block managing section 17 comprises an unused-block queue for connecting unused reception blocks, and a used-block queue for connecting reception blocks which store data. In the initial state, all the reception blocks are connected to the unused-block queue. In accordance with a block determining process which will be described later, the block managing section 17 selects a reception block of a suitable size, from the unused reception blocks, and delivers the selected reception block to the communication task 11. The delivered reception block is moved from the unused-block queue to the used-block queue. When a reception block is returned from the image production task 12, the returned reception block is moved from the used-block queue to the unused-block queue.

Next, the communication task 11 stores the print data into the reception block delivered from the block managing section 17 until the reception block is filled with the data. Specifically, when a packet arrives from the network 100, the communication task 11 takes out print data from the packet, and stores the print data into the reception block. The reception block storing the print data is delivered to the image production task 12. The priority of the communication task 11 is set to be higher than that of the image production task 12 and lower than that of the print task 13. When a packet is received during production of the print request, therefore, the communication task 11 is executed with priority to the image production task 12. Even when a packet is received from the network 100 during execution of the print task 13, however, the communication task 11 is not executed.

The image production task 12 reads out the print data from the reception block and interprets the print data to produce a print request in the unit of a page. The reception block from which the print data are taken out is returned to the block managing section 17. Finally, the print task 13 drives the engine controlling section 8 so as to perform the printing operation, on the basis of the print request supplied from the image production task 12.

Figure 3:
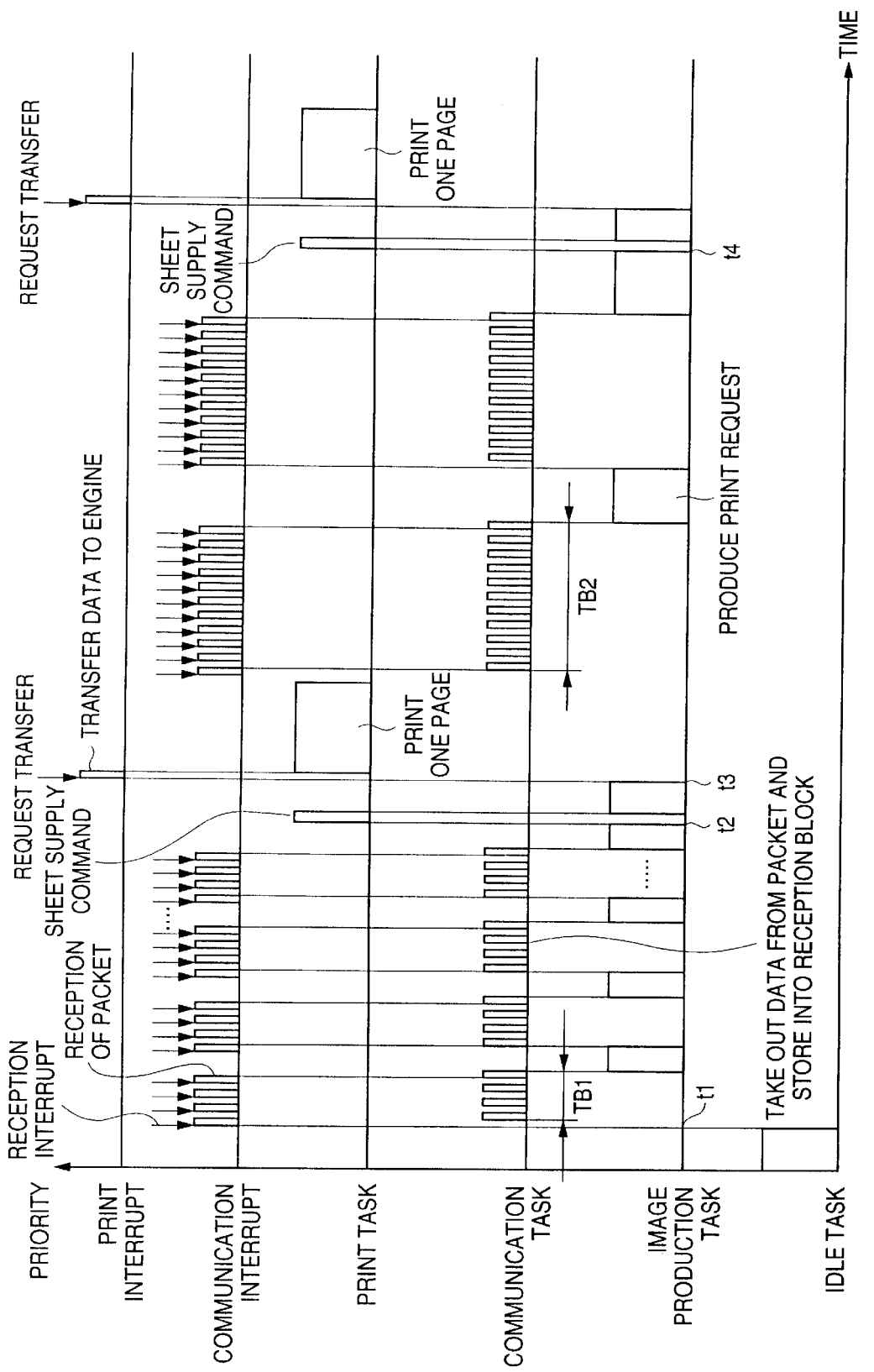
FIG. 3 is a time chart showing execution states of the tasks.

FIG. 3 is a time chart schematically showing temporal changes of execution states of the tasks. In the figure, the ordinate indicates the priorities of interrupt operations and the tasks. Priorities are assigned in the sequence of a print interrupt, a reception interrupt (communication interrupt), the print task, the communication task, the image production task, and an idle task.

Immediately after power-on, the communication task 11, the image production task 12, and the print task 13 are produced and then enter the waiting state. During a time period when any of the tasks 11 to 13 is not executed, the idle task having the priority which is the lowest among all the tasks is executed.

When a packet arrives from the network 100 at certain time t1, the reception interrupt is generated. When the reception interrupt is generated and the packet is received, the communication task 11 acquires the CPU execution privilege and is then activated. Each time when a packet is received, the communication task 11 takes out print data from the packet and stores the data into a reception block. When a predetermined time period TB depending on the size of the reception block and the data receiving rate elapses, the reception block is filled with print data.

When the reception block is filled with print data and a task or an interrupt process having a priority which is higher than that of the image production task 12 is not generated, the image production task 12 acquires the CPU execution privilege. The image production task 12 takes out the print data from the reception block and produces a print request. The image production task 12 is executed in intervals between executions of the communication task 11. As a result, a print request for one page is completed at time t2.

When the print request is produced, the print task 13 is activated. The print task 13 outputs a sheet supply command and then returns the CPU execution privilege. During a time period from a timing when the print engine is instructed to supply a sheet to that when a sheet is transported to a print position, when a task or an interrupt process having a priority which is higher than that of the image production task 12, the CPU execution privilege is again transferred to the image production task 12. In FIG. 3, therefore, the image production task 12 starts to produce a print request for a second page, after the print task 13 issues the sheet supply command.

At time t3, a sheet is transported to the print position and the printing operation is ready. Then, a transfer request for image data is generated as a print interrupt. In response to this transfer request, the print request for the first page is transferred to the engine controlling section 8. Next, the print task 13 acquires the CPU execution privilege, and printing of the first page is conducted. Since the image production task 12 is lower in priority than the print task 13, the generation of a print request by the image production task 12 is interrupted. In contrast, even when the communication interrupt is generated during execution of the print task 13, the print task 13 is not interrupted because the communication task 11 has the priority which is lower than that of the print task 13. In FIG. 3, for the sake of convenience in description, only two processes of the sheet-supply command and printing are illustrated. Actually, other processes such as a sheet-discharge command, and error processes against a paper jam are performed.

When printing of the first page is ended, the communication task 11 which has been in the waiting state is executed so that the print data are stored in the reception block. When the print request for the second page is produced then or at time t4, the print task 13 is executed in the same manner as described above so that printing of the second page is started.

Time periods TB1 and TB2 shown in FIG. 3 are time periods each of which is required for filling one reception block with print data. If all packets have the same length and are received at constant intervals and a constant rate, the time periods TB1 and TB2 are proportional to the size of the reception block. Strictly speaking, the lengths of packets are changed in the range of several tens bytes to one thousand several hundreds bytes, and also the traffic congestion of the network 100 is changed. Therefore, the time period TB1 or TB2 does not always correctly reflect the size of the reception block.

Next, the function of the embodiment will be described with reference to FIGS. 4 to 7. In the figures, a step is abbreviated as "S."

Figure 4:
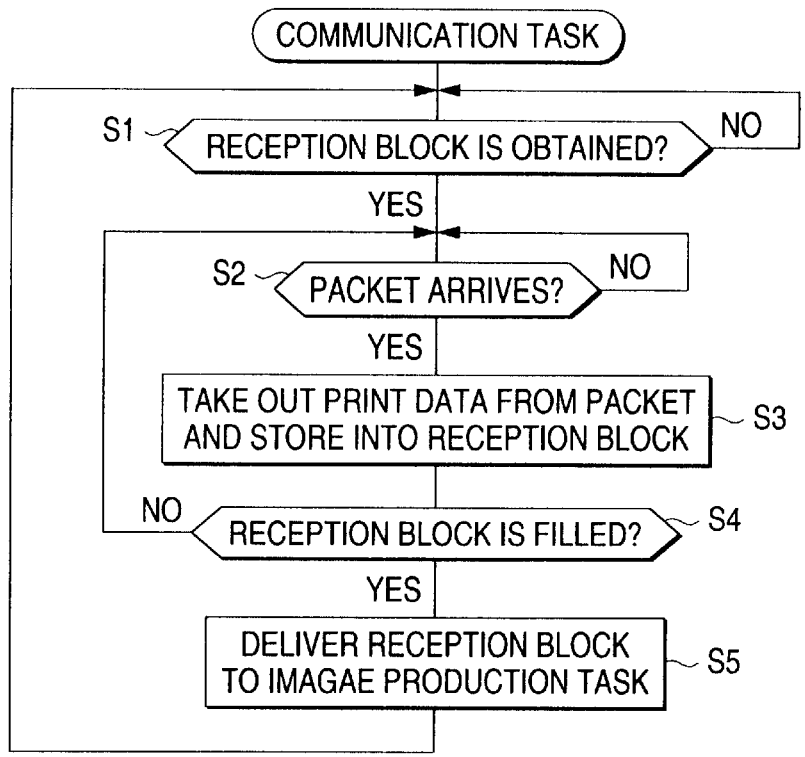
FIG. 4 is a flowchart showing a process of a communication task.

The flowchart of FIG. 4 shows the process of the communication task 11. In S1, it is judged whether a reception block is acquired from the block managing section 17 or not, and, in S2, it is judged whether a packet is received by a reception interrupt or not. In other words, the communication task 11 is kept to be in the waiting state until a reception block is acquired and a packet is received. A process of determining a reception block which is to be given to the communication task 11 will be described later.

If a reception block is acquired and a packet is received (S1 and S2: YES), extra data such as a source address and a destination address are removed away from the received packet, to take out print data, and the print data are stored into the reception block (S3). The processes of S2 and S3 are repeated until it is judged in S4 that the reception block is filled with print data. If the reception block is filled with print data (S4: YES), the reception block is delivered to the image production task 12 (S5).

Figure 5:
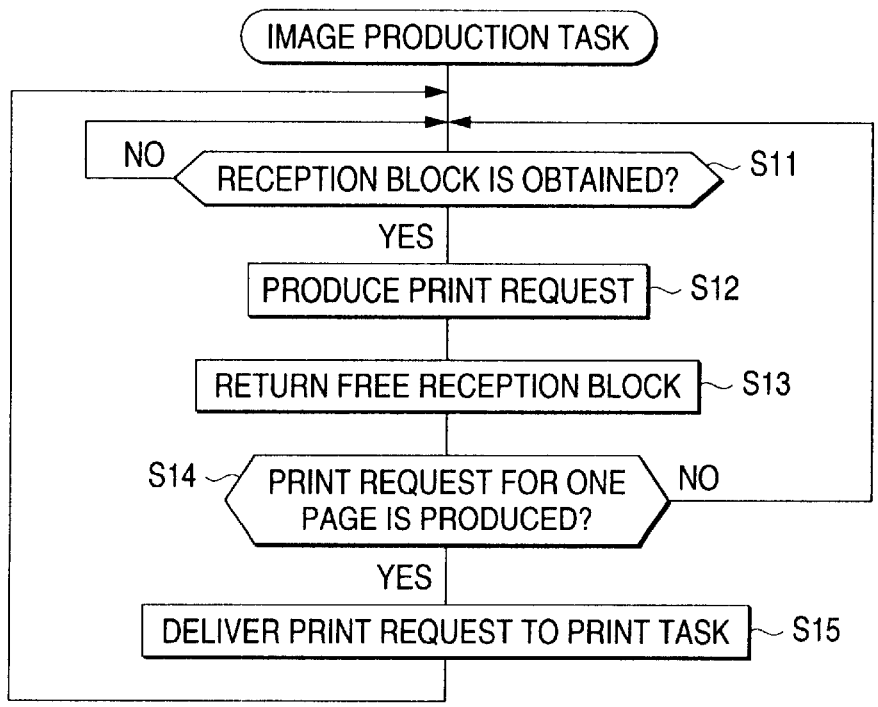
FIG. 5 is a flowchart showing a process of an image production task.

FIG. 5 is a flowchart showing the process of the image production task 12. In S11, it is judged whether the reception block is delivered from the communication task 11 or not. If the reception block storing print data is transferred (S11: YES), the print data are read out from the reception block and a print request is produced (S12). The free reception block from which the print data have been read out is returned to the block managing section 17 (S13). Next, it is judged whether a print request for one page is completed or not (S14). The processes of S11 to S13 are repeated until a print request for one page is produced. If a print request for one page is produced (S14: YES), the print request is supplied to the print task 13 (S15).

The outline of the process of the print task 13 is shown in the print task 13 in FIG. 1, and hence the process is briefly described with reference to FIG. 1. The print task 13 is in the waiting state until a print request for one page is produced by the image production task 12 (SN). If a print request is produced (SN: YES), printing is performed on the basis of this print request (SN+1). In the above, SN is the number of a step, and may have any value which does not overlap with another step number.

Figure 6:
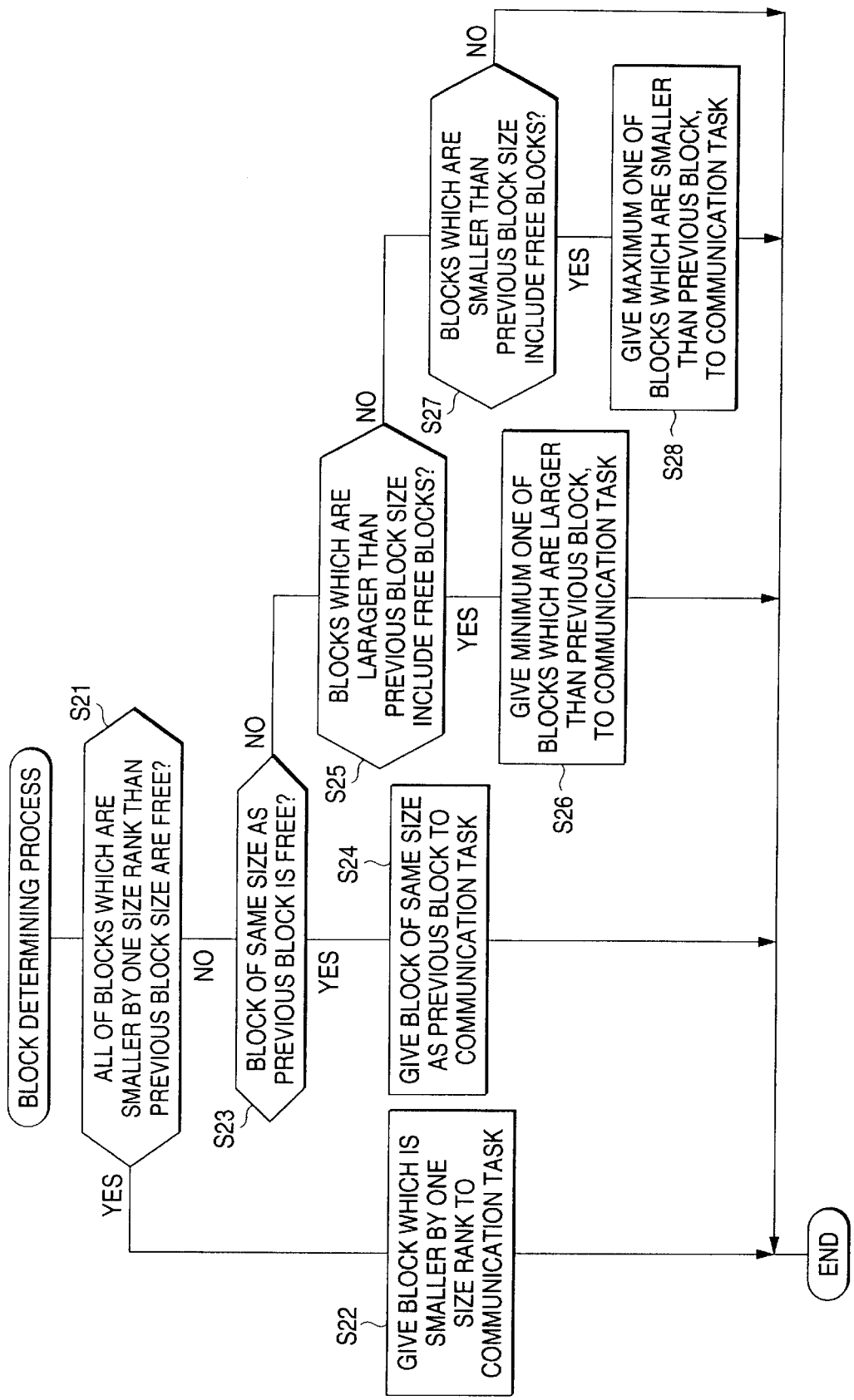
FIG. 6 is a flowchart showing a process of determining a reception block.

FIG. 6 is a flowchart showing the process of determining a reception block in the block managing section 17.

This process is started in response to a call from the communication task 11. First, it is judged whether all of blocks which are smaller by one size rank than the reception block that is used at a previous time are free or not (S21). In the embodiment, the sizes of the reception blocks are quadrupled, such as 1 kB, 4 kB, and 16 kB. Therefore, a reception block which is smaller by one size rank than the reception block that is used at a previous time corresponds to a reception block having a size which is one fourth that of the reception block that is used at a previous time. In the case where there are initially N reception blocks which are smaller by one size rank, it is judged in S21 whether all of N reception blocks are free or not. In the embodiment, therefore, "predetermined number" corresponds to the total number N of reception blocks of each size. Alternatively, as the predetermined number, a number which is smaller than the total number N, such as N−1, N−2 or the like may be set. Among the sizes, the total numbers N of reception blocks may be different from one another. For example, reception blocks of a size which is more frequently used may be prepared in a larger number than those of a size which is less frequently used. The reference value (predetermined number) in the judgment of S21 may be varied in accordance with the size of the previous block. For example, in the case where the previous block has a size of 16 kB, it may be judged whether Nx reception blocks of 4 kB are free or not, and, in the case where the previous block has a size of 64 kB, it may be judged whether Ny reception blocks of 16 kB are free or not.

The case where all of reception blocks which are smaller by one size rank than the previous block are free (S21: YES) corresponds to that.where the data processing rate in the printer is relatively higher than the rate of receiving data from the network 100. In this case, therefore, a reception block the size of which is smaller by one size rank than the previous block is given to the communication task 11 (S22). As a result, the unit which is used in storing print data by the communication task 11 is made smaller than that in the previous operation, and chances of activation of the image production task 12 are increased.

In contrast, if all of reception blocks which are smaller by one size rank than the previous reception block are not free (S21: NO) or if even one of reception blocks which are smaller by one size rank is used, it is judged whether a reception block of a size which is equal to that of the previous block is free or not (S23). The case where all of reception blocks which are smaller by one size rank than the previous reception block are not free and a reception block of the same size is free (S23: YES) corresponds to that where the rate of receiving data from the outside of the printer substantially balances with the data processing rate in the printer. Therefore, the reception block of a size which is equal to that of the previous block is given to the communication task 11 (S24).

The case where a reception block of a size which is equal to that of the previous block is not free (S23: NO) corresponds to that where the data receiving rate is relatively higher than the data processing rate and the operation of taking out print data from a reception block is delayed. Therefore, it is judged whether reception blocks of a size which is larger than that of the previous block include free reception blocks or not (S25). If the reception blocks of a larger size include free reception blocks (S25: YES), a reception block of the minimum size among the free reception blocks is given to the communication task 11 (S26). As a result, the unit which is used in storing print data by the communication task 11 is made larger, and therefore the communication task 11 and the image production task 12 are prevented from being frequently switched over, whereby the time period of switching over the tasks can be shortened.

The case where reception blocks of a size which is larger than that of the previous block include no free reception block (S25: NO) corresponds to that where there is no alternative for selection of an available reception block. Therefore, it is judged whether reception blocks of a smaller size include a free reception block or not (S27). If there is a free reception block (S27: YES), this reception block is given to the communication task 11 (S28). If reception blocks of a size which is smaller than that of the previous block include no free reception block (S27: NO) corresponds to that where all reception blocks are used. Therefore, the process is ended without giving a reception block to the communication task 11. In this case, the communication task 11 fails to obtain a new reception block, and hence the activation conditions are not satisfied. As a result, the task cannot acquire the CPU execution privilege.

The block managing section 17 provides the communication task 11 with a reception block of the minimum size (1 kB) as the initial value. Therefore, the initial one or plural packets are stored into a reception block of a size of 1 kB. Thereafter, since there is no reception block of a size which is smaller than 1 kB (S21: NO) and reception blocks of 1 kB include a free reception block (S23: YES), also the second provided reception block has a size of 1 kB. When the data receiving rate balances with the data processing rate, reception blocks of 1 kB are given to the communication task 11 in a repeated manner. If the data receiving rate is higher than the data processing rate, reception blocks of 1 kB are exhausted. Among the reception blocks of a size which is larger than that of a previous block, consequently, a reception block of the minimum size, i.e., that of 4 kB is selected (S23: NO. S25: YES, S26).

In this way, the block managing section 17 estimates relationships between the data receiving rate and the data processing rate on the basis of the use states of the reception blocks of plural sizes, and provides the communication task 11 with a reception block of a size which is suitable based on relationships between the rates.

Figure 7:
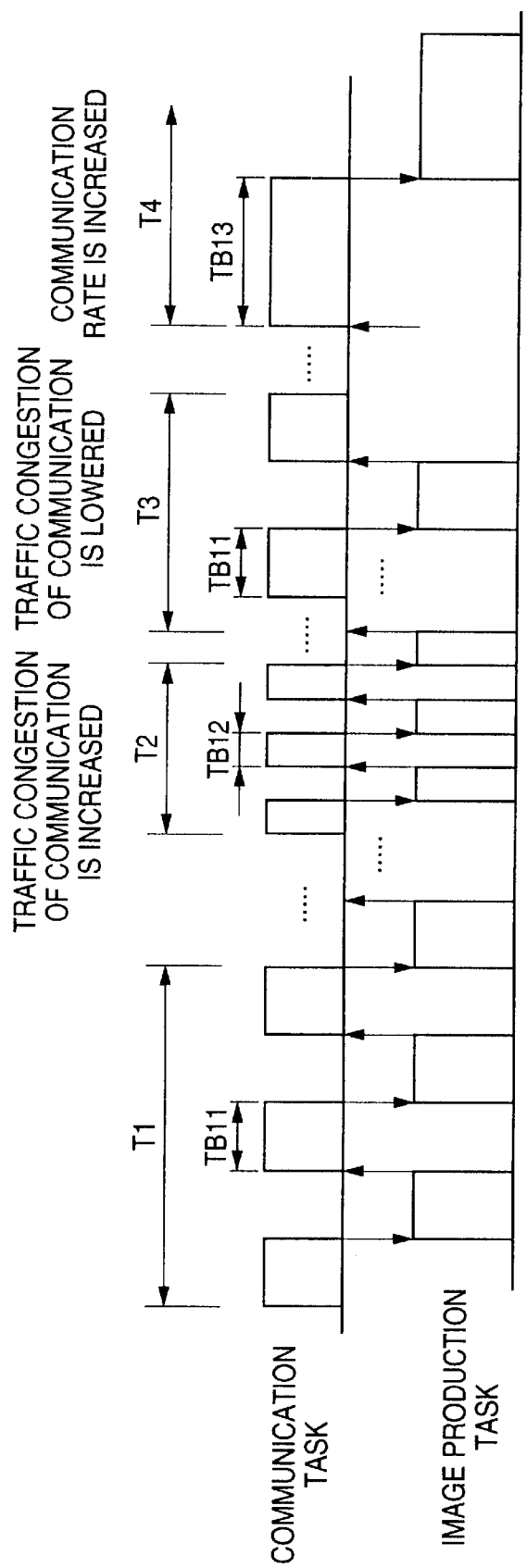
FIG. 7 is a time chart showing a situation in which the size of a reception block is changed in accordance with the traffic congestion of communication.

FIG. 7 is a diagram schematically showing changes in size of reception blocks. In an initial time period T1, reception blocks corresponding to the time period TB11. When the traffic congestion of the network 100 is increased in the next time period T2, the intervals of reception of packets from the network 100 are widened and the data receiving rate is relatively lowered with respect to the data processing rate. This causes reception blocks which are smaller by one size rank, to be given to the communication task 11. Therefore, a time period TB12 becomes shorter than the time period TB11. When the traffic congestion of the communication is lowered in a time period T3, reception blocks which are larger by one size rank are again used. When the traffic congestion of the communication is further lowered in a time period T4, reception blocks which are further larger by one size rank are used. Therefore, a time period TB13 becomes longer than the time period TB11.

The thus configured embodiment can attain the following effects.

First, since the block managing section 17 which controls the operation states of the communication task 11 and the image production task 12 in accordance with the relationships between the data receiving rate and the data processing rate is disposed, it is possible to cope with changes in both the data processing rate which is changed according to the traffic congestion of the communication, and the data processing rate which is changed depending on the contents of the print job. Consequently, the operation states of the tasks 11 and 12 can be suitably controlled in accordance with environmental changes of the exterior (data receiving rate) and the interior (data processing rate) of the printer. In the case of a network printer in which the single CPU 3 performs even a network process, particularly, the CPU execution time period can be suitably allocated to the tasks 11 and 12. Consequently, the process efficiency can be improved and the throughput of printing can be enhanced.

In the case where the single CPU 3 is used and the priority of the communication task 11 is set to be higher than that of the image production task 12, especially, a particular effect is attained. When the priority of the communication task 11 is set to be higher than that of the image production task 12, the host computer can be early released from transmission of print data. When the data receiving rate is caused to be relatively lower, however, the waiting time of the image production task 12 is prolonged, so that printing is delayed, with the result that there arises a fear that the throughput of printing is lowered. In the embodiment, therefore, the CPU execution time periods of the communication task 11 and the image production task 12 are suitably assigned. Consequently, the host computer can be early released and the print waiting time can be shortened.

Second, when the data receiving rate is relatively lower, the transfer amount of data which are supplied to the image production task 12 is decreased, and, when the data receiving rate is relatively higher, the data transfer amount is increased. Therefore, the execution time periods of the tasks 11 and 12 can be controlled easily and suitably. Specifically, when the data transfer amount is decreased, the image production task 12 frequently receives a relatively small amount of data, and hence chances of activation are increased. Even when the packet reception is delayed, therefore, the waiting time of the image production task 12 can be shortened and the print request can be promptly produced. When the data transfer amount is increased, the image production task 12 receives a relatively large amount of data at a small number of receptions, and hence the number of switching operations between the communication task 11 and the image production task 12 can be reduced. Consequently, the time period of switching over the tasks can be shortened and the process efficiency can be enhanced.

Third, reception blocks of plural sizes are prepared, and the size of a reception block which is to be used by the communication task 11 is dynamically changed in accordance with the relative relationship between the data receiving rate and the data processing rate. Therefore, the CPU execution time periods allocated to the tasks 11 and 12 can be suitably controlled by a relatively simple configuration.

Fourth, as exemplified in the block size determining process of FIG. 6, the size of a reception block which is to be supplied to the communication task 11 is determined on the basis of the use states of the reception blocks. Therefore, it is not required to monitor the data receiving rate and the data processing rate, and the execution time periods of the tasks 11 and 12 can be controlled by a simpler configuration.

Next, a second embodiment of the invention will be described with reference to FIGS. 8 and 9. In the embodiment, components which are identical with those of the first embodiment are designated with the same reference numerals, and their description is omitted. The embodiment is characterized in that the data receiving rate and the data processing rate are monitored so that a reception block of a suitable size is produced.

Figure 8:
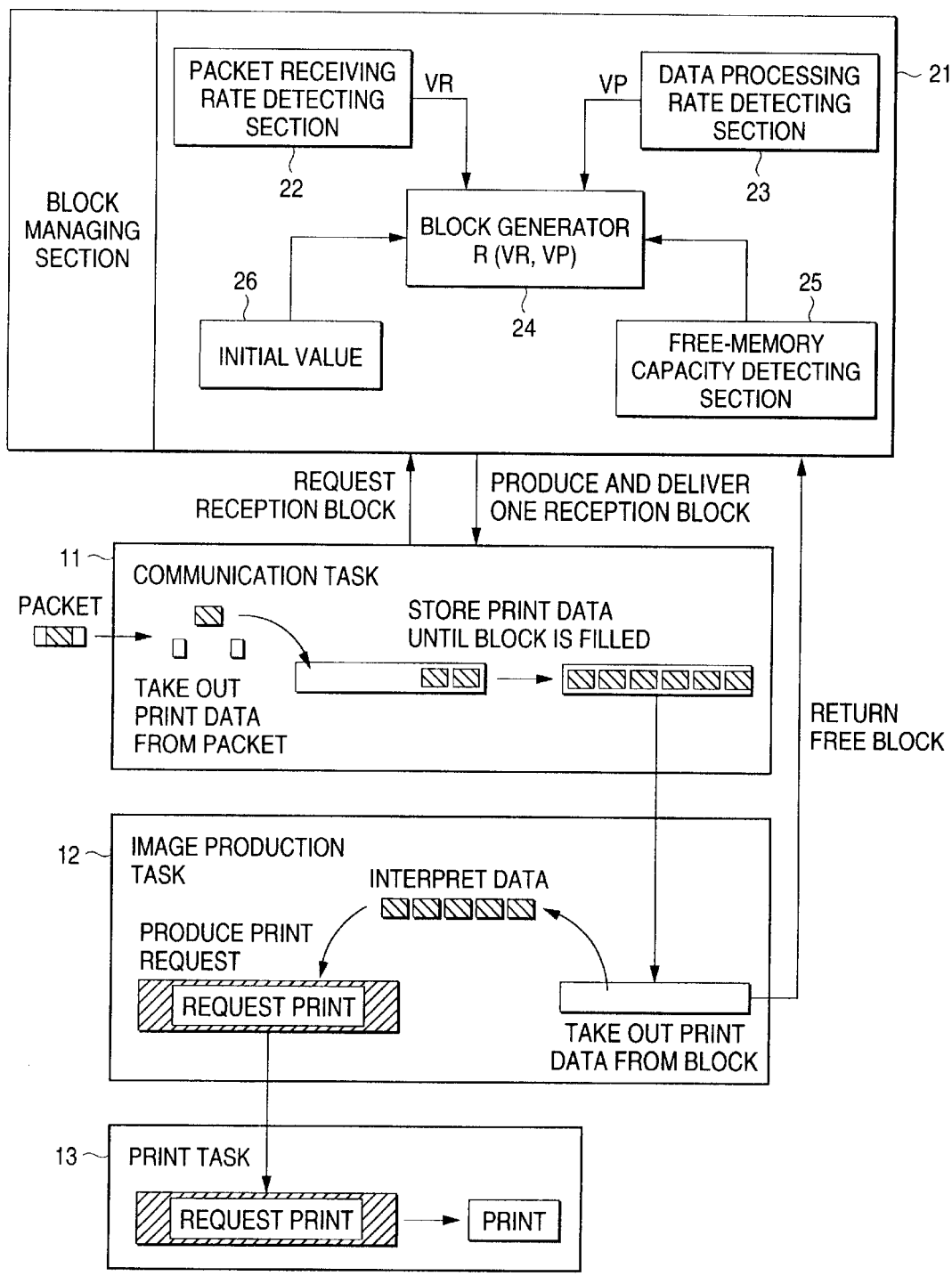
FIG. 8 is a diagram showing relationships among a block managing section and tasks in a network printer of a second embodiment of the invention.

FIG. 8 is a diagram showing relationships among a block managing section 21 and the tasks 11 to 13 in the embodiment. The block managing section 21 comprises: a packet receiving rate detecting section 22 which detects the rate of receiving packets from the network 100; a data processing rate detecting section 23 which detects the data processing rate; a block generator 24 which produces a reception block; and a free-memory capacity detecting section 25 which detects the capacity of an available free memory.

In the block generator 24, in accordance with a request from the communication task 11, the packet receiving rate VR and the data processing rate VP are supplied to a preset block generation function R, thereby producing a suitable reception block of a suitable size corresponding to the relative relationship between the rates VR and VP. The block generator 24 considers also the capacity of an available free memory. A reduced capacity of an available free memory means that there are a large number of waiting reception blocks. In this case, therefore, a reception block may not be given to the communication task 11, so that the execution time period of the image production task 12 is prolonged, whereby the waiting reception blocks are enabled to be first processed. An initial-value storing section 26 stores the size of a reception block which is to be first given to the communication task 11.

Figure 9:
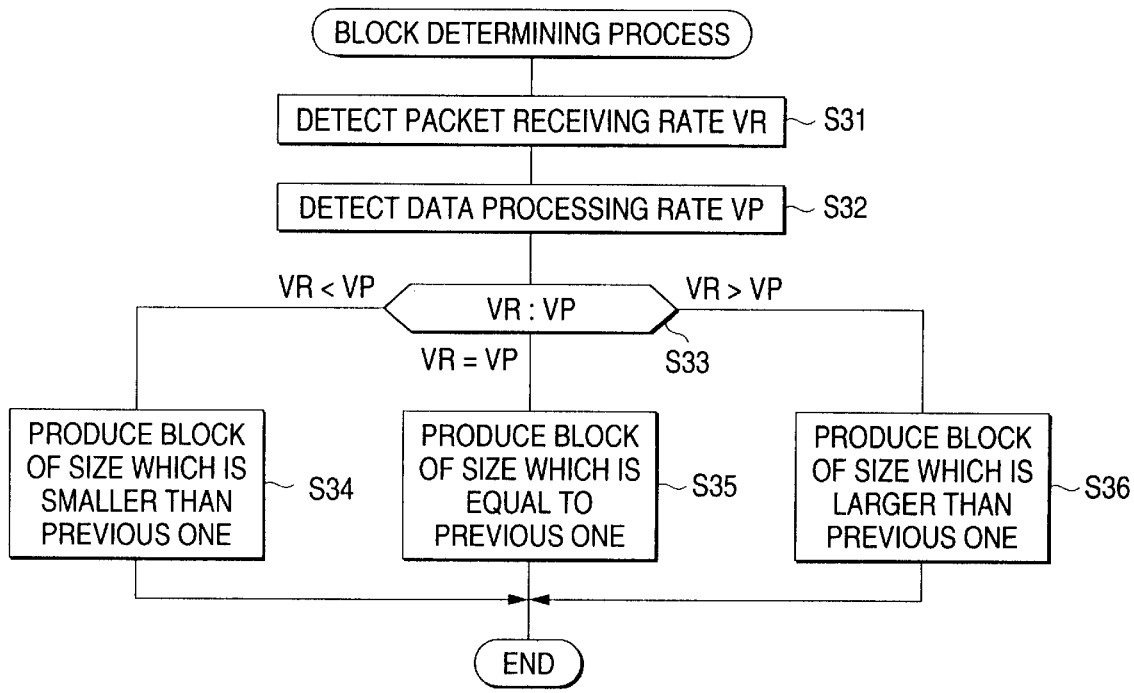
FIG. 9 is a flowchart showing a process of determining a reception block.

FIG. 9 is a flowchart showing the process of determining a reception block in the block managing section 21. First, the packet receiving rate VR and the data processing rate VP are detected (S31 and S32). Next, the rates VR and VP are compared with each other (S33). In the comparison of the rates VR and VP, a predetermined weighting or the like may be performed.

If the packet receiving rate VR is lower than the data processing rate VP (VR<VP), a reception block of a size which is smaller than that of a block that is given at a previous time is produced, and the produced reception block is given to the communication task 11 (S34). If the rates VR and VP balance with each other (VR=VP), a reception block of a size which is equal to that of the previous block is produced, and the produced reception block is given to the communication task 11 (S35). If the packet receiving rate VR is higher than the data processing rate VP (VR>VP), a reception block of a size which is larger than that of the previous block is produced, and the produced reception block is given to the communication task 11 (S36). The size which is equal to that of the previous block is not restricted to the strictly identical size because a reception block of a size which is within a predetermined range with respect to the size of the previous block may be given.

Also in the thus configured embodiment, it is possible to attain the same effects as those of the first embodiment. In addition, in the embodiment, a reception block of a suitable size is produced on the basis of the packet receiving rate VR and the data processing rate VP, and hence it is possible to more rapidly optimize the CPU execution time periods allocated to the communication task 11 and the image production task 12. The embodiment is particularly effective in the case where an available memory has a large capacity, because, even when a reception block of a relatively large size is calculated by the block generation function R, this request can be satisfied. In other words, in the case where the capacity of an available memory is small, the first embodiment is advantageous. When an available memory resource is previously partitioned into reception blocks of plural sizes, it is possible to promptly provide a reception block of a size which is required in a present execution time period control although the size may not be an optimum value. Therefore, even a small memory resource can be effectively used.

A person skilled in the art can perform various additions, modifications, and the like within the scope of the spirit of the invention which is described in the embodiments. For example, a computer of a printer may read predetermined programs which are recorded on a recording medium, so that the invention can be realized.

Figure 10:
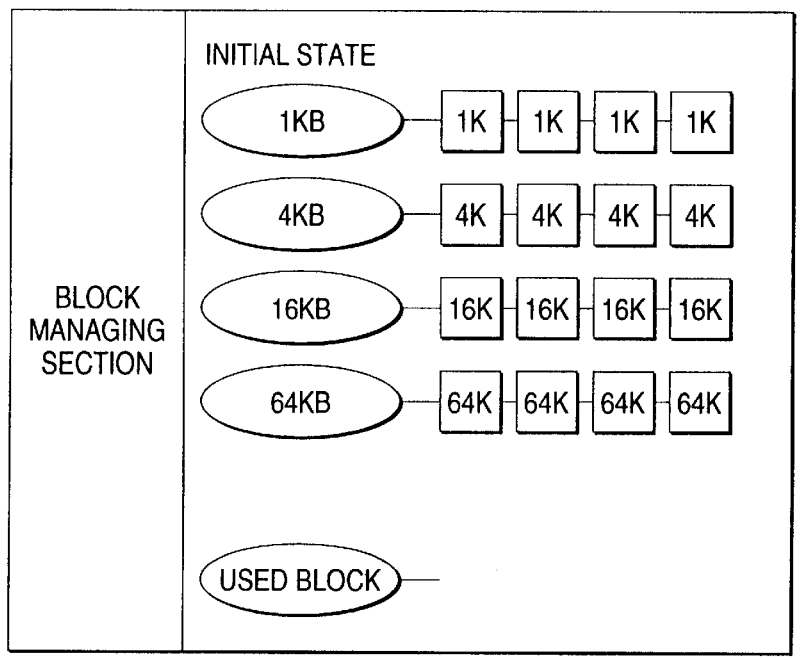
FIG. 10 is a diagram showing a block managing section of a network printer of a modification of the invention.

As shown in FIG. 10, the unused-block queue may be disposed for each of the block sizes.

In the first embodiment, the four kinds of block sizes of 1 kB, 4 kB, 16 kB, and 64 kB which are changed by quadruple are used as an example. The invention is not restricted to this. For example, sizes of other kinds, such as 1 kB, 4 kB, 8 kB, 16 kB, 32 kB, and 64 kB may be prepared. The block sizes which are changed by quadruple is a particularly preferred example and may be employed as one of features of the invention. In the case where reception blocks which are changed in the unit of 1 kB, such as 1 kB, 2 kB, and 3 kB are prepared, the control can be performed more finely, but the management of blocks is complicated because the kinds of reception blocks are increased. By contrast, in the case where reception blocks which are changed in a large unit, such as 1 kB, 128 kB, and 256 kB are prepared, it is difficult to suitably control the execution time periods of the tasks 11 and 12. Considering the easiness of the block management and the execution time period control of the tasks 11 and 12, therefore, it is preferable to prepare reception blocks which are changed in size by quadruple.

In the above, the case where the initial value of the block size is 1 kB has been described. Alternatively, for example, a reception block of intermediate size, such as 4 kB or 16 kB may be set as the initial value. When a block size corresponding to a print job which is more frequently is used as the initial value, particularly, the possibility that all data of a print job can be stored into the initial reception block is raised and the process efficiency is improved.

The single CPU 3 is not required to be single in the physical meaning. Even when plural CPUs are used in the physical meaning, the CPUs may function in the same manner as a single CPU in execution of the communication task 11 and the image production task 12. Also such a case is included within the scope of the invention.

The printer is not restricted to an apparatus dedicated to printing, and may be a composite apparatus additionally having other functions as a copier, and a facsimile apparatus.

As described above, according to the network printer and the network printing method of the invention, in both the cases where the data receiving rate is varied in accordance with the traffic congestion of a network and where the data processing rate is varied in accordance with the contents of a print job, the operation states of the communication processing section and the image production processing section can be suitably controlled and the process efficiency can be improved.

Furthermore, plural reception blocks of plural sizes are prepared, and a reception block which is to be used next time is determined in accordance with the use state of the reception blocks. Therefore, the operation states of the communication processing section and the image production processing section can be suitably controlled by a relatively simple configuration.

Although the invention has been described in its preferred formed with a certain degree of particularity, it is understood that the present disclosure of the preferred form can be changed in the details of construction and in the combination and arrangement of parts without departing from the spirit and the scope of the invention as hereinafter claimed.

What is claimed is:

1. A network printer which performs printing based on data received via a network, said printer comprising:
a communication processing section which receives the data via the network;
an image production processing section which interprets the data supplied from said communication processing section and produces image data;
a print processing section which controls a drive of a print engine based on the image data supplied from said image production processing section, thereby performing printing; and an operation state controlling section which controls an operation state of said communication processing section and an operation state of said image production processing section in accordance with a data receiving rate from said network and a data processing rate in said image production processing section.

2. A network printer according to claim 1, wherein said operation state controlling section controls a transfer amount of the data which are supplied from said communication processing section to said image production processing section, thereby controlling the operation state of said communication processing section and the operation state of said image production processing section.

3. A network printer according to claim 2, wherein, when the data receiving rate is lower than the data processing rate, said operation state controlling section decreases the data transfer amount, and when the data receiving rate is higher than the data processing rate, said operation state controlling section increases the data transfer amount.

4. A network printer according to claim 3, wherein said operation state controlling section has plural memory blocks each having plural sizes, said memory blocks being used for transferring the data from said communication processing section to said image production processing section, and said operation state controlling section determines one of said memory blocks to be used next time in accordance with the data receiving rate and the data processing rate.

5. A network printer according to claim 4, wherein said operation state controlling section, when memory blocks of a size which is smaller than a size of a memory block that is used at a previous time are free in a number which is equal to or larger than a predetermined number, selects one of said memory blocks of a smaller size, when memory blocks of a size which is smaller than a size of the memory block that is used at the previous time are not free in a number which is equal to or larger than the predetermined number and a memory block of a size which is equal to the size of the memory block that is used at the previous time is free, selects said memory block of the same size, and when said memory block of the same size is not free and a memory block of a size which is larger in size than the size of the memory block that is used at the previous time is free, selects said memory block of a larger size.

6. A network printer according to claim 5, wherein a memory block of a minimum size is set as an initial value in said operation state controlling section.

7. A network printer according to claim 5, wherein a memory block of an intermediate size is set as an initial value in said operation state controlling section.

8. A network printer according to claim 3, wherein said operation state controlling section determines a size of a memory block which is used for transferring the data from said communication processing section to said image production processing section in accordance with the data receiving rate and the data processing rate, and produces a memory block of the determined size.

9. A network printer according to claim 8, wherein said operation state controlling section, when the data receiving rate is lower than the data processing rate, produces a memory block of a size which is smaller by a predetermined value or more than a size of a memory block that is used at a previous time, when the data receiving rate is higher than the data processing rate, produces a memory block of a size which is larger by a predetermined value or more than the size of the memory block that is used at the previous time, and when the data receiving rate balances with the data processing rate, produces a memory block of a size which is within a predetermined range with respect to the size of the memory block that is used at the previous time.

10. A network printer according to claim 1, wherein at least said communication processing section and said image production processing section are executed by a single processing unit.

11. A network printer according to claim 10, wherein said communication processing section is higher in priority for acquiring execution privilege in said processing unit than said image production processing section.

12. A network printer comprising:

a communication task for receiving data via a network;

an image production task having a lower priority than said communication task and interpreting the data supplied from said communication task thereby producing image data;

a print processing section which controls a drive of a print engine based on the image data supplied from said image production task; and a single central processing unit switchably executing said communication task and said image production task, wherein an operation state of said image production task is controlled in accordance with a rate of receiving data which are supplied from said network to said communication task and a data processing rate in said image production task.

13. A network printing method in which a communication task for receiving data via a network, an image production task of interpreting the data supplied from said communication task thereby producing image data, and a print task for performing printing based on the image data supplied from said image production task are switchably executed by a single central processing unit, wherein a priority for acquiring execution privilege in said processing unit is higher in a sequence of said print task, said communication task and said image production task, said method comprising steps of:

determining a size of a memory block for storing the data supplied to said image production task in accordance with a rate of receiving the data which are supplied from the network to said communication task and a data processing rate in said image production processing task so as to provide said image production task with a suitable execution time period;

storing the data received from said network into a memory block of the determined size by said communication task;

informing said image production task that the data are stored into said memory block;

reading data from said memory block to produce image data by said image production task;

informing said print task of the production of image data; and performing printing based on the supplied image data by said print task.

14. A recording medium on which a program for controlling a network printer which performs printing based on data received via a network are recorded, wherein the program for causing a computer to realize the following elements are recorded in such a form that said program is readable and understandable by the computer, said elements comprising:

a communication processing section which receives the data via the network;

an image production processing section which interprets the data supplied from said communication processing section and produces image data;

a print processing section which controls a drive of a print engine based on the image data supplied from said image production processing section thereby performing printing; and an operation state controlling section which controls a transfer amount of the data which are supplied from said communication processing section to said image production processing section in accordance with a rate of receiving the data from said network and a data processing rate in said image production processing section.

* * * * *

UNITED STATES PATENT AND TRADEMARK OFFICE
CERTIFICATE OF CORRECTION

PATENT NO. : 6,618,164 B1  
DATED : September 9, 2003  
INVENTOR(S) : Shima

Page 1 of 1

It is certified that error appears in the above-identified patent and that said Letters Patent is hereby corrected as shown below:

<u>Title page,</u>  
Insert Item  
-- [30] Foreign Application Priority Data  
October 12, 1999     (JP)     Japan……………….. 10-291910 --.

Signed and Sealed this

Twenty-first Day of March, 2006

JON W. DUDAS  
*Director of the United States Patent and Trademark Office*